United States Patent [19]

Poldervaart et al.

[11] Patent Number: 5,181,748

[45] Date of Patent: Jan. 26, 1993

[54] QUICK-ACTING COUPLING AND QUICK-ACTING COUPLING ASSEMBLY

[75] Inventors: Leendert Poldervaart, La Turbie; René Perratone, Menton, both of France

[73] Assignee: Single Buoy Moorings Inc., Marly, Switzerland

[21] Appl. No.: 810,160

[22] Filed: Dec. 19, 1991

[30] Foreign Application Priority Data

Dec. 19, 1990 [NL] Netherlands ............................ 9002816

[51] Int. Cl.⁵ .......................................... F16L 35/00
[52] U.S. Cl. ............................... 285/24; 285/133.2; 285/334.3; 285/910
[58] Field of Search ..................... 285/24, 133.2, 334.3, 285/910, 133.1, 138

[56] References Cited

U.S. PATENT DOCUMENTS

| | | | |
|---|---|---|---|
| 4,188,050 | 2/1980 | Lochte | 285/24 |
| 4,701,074 | 10/1987 | Hall | 285/24 |
| 4,726,610 | 2/1988 | George et al. | 285/133.2 X |
| 4,784,410 | 11/1988 | Peppel et al. | 285/133.2 |
| 4,828,291 | 5/1989 | Mitchell et al. | 285/133.2 X |
| 4,902,045 | 2/1990 | McGugan et al. | 285/24 |
| 4,905,938 | 3/1990 | Braccio | 285/34 X |

FOREIGN PATENT DOCUMENTS 2224329 5/1990 United Kingdom .

Primary Examiner—Dave W. Arola
Attorney, Agent, or Firm—Young & Thompson

[57] ABSTRACT

A quick-acting coupling for the fluid-tight connection of two parts, each with sealing elements with sealing faces, is provided with at least one sealing face having a flexible seal, as well as a coupling for connecting the parts in such a way that they do not move relative to each other. In order to simplify the coupling and to reduce its costs, the sealing element of one part has a bevelled end and the sealing element of the other part has a correspondingly bevelled socket. The flexible seal is free-standing and radially unconfined over the entire height of its contact with the other sealing face.

8 Claims, 5 Drawing Sheets

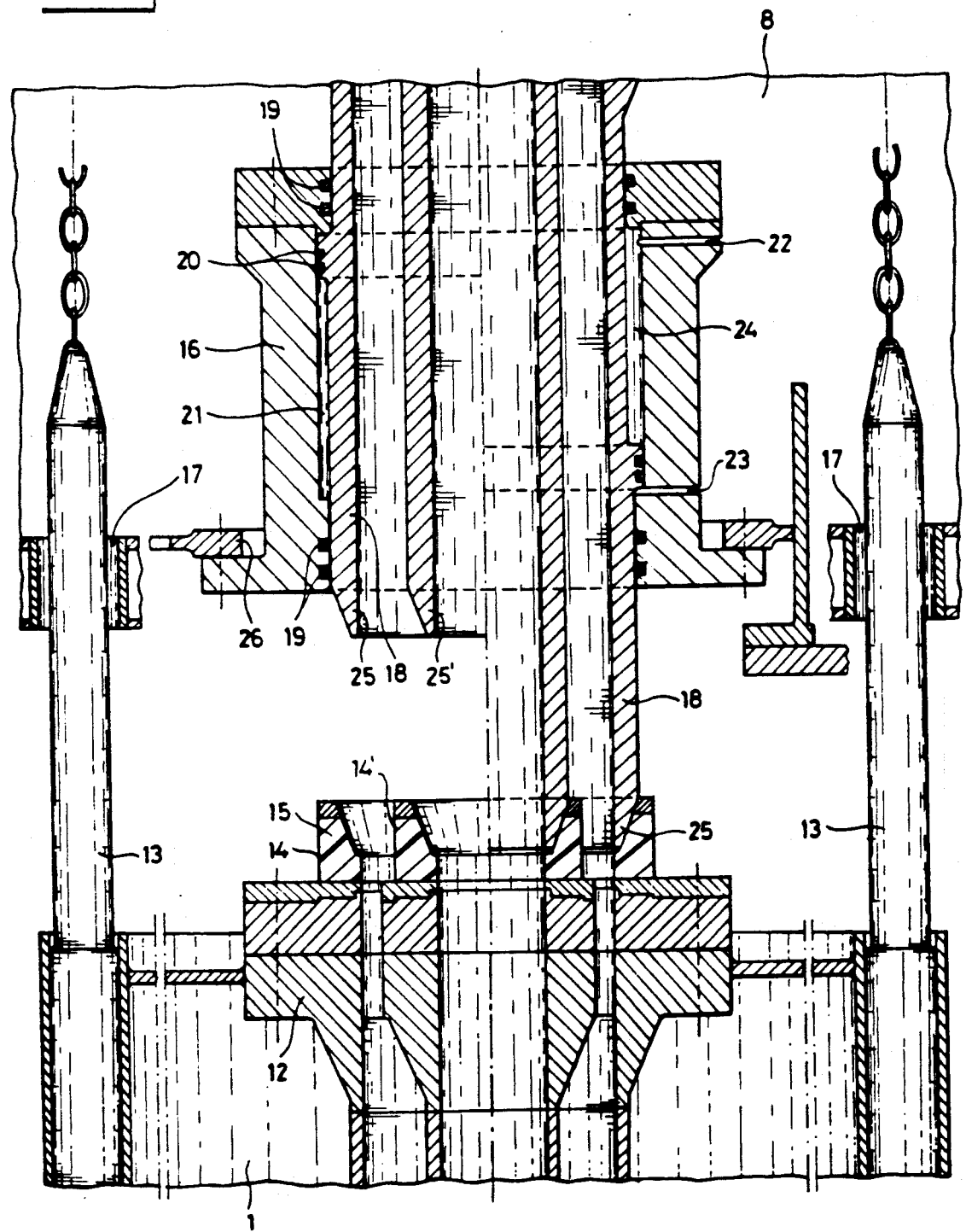

QUICK-ACTING COUPLING AND QUICK-ACTING COUPLING ASSEMBLY

The present invention relates to a quick-acting coupling for the fluid-tight connection of two parts, each provided with sealing elements with sealing faces, at least one sealing face having flexible sealing means, and coupling means being present for connecting said parts in such a way that they do not move relative to each other.

Such a quick-acting coupling is generally known in the state of the art. It comprises two pipe parts whose sealing elements have flanges at their ends. Coupling means are fitted hingedly on one of the flanges. After bringing together the two flange parts, said coupling means are operated in such a way that the two flange parts are pressed against each other. Rubber rings, fitted in grooves in one of the flanges, are used for the sealing. The two flanges must in this case be ground accurately flat, and grooves have to be turned in at least one flange for the accommodation of the O-rings.

Such quick-acting couplings are used for quick coupling and uncoupling of pipes, for example forming the connection between a well on the seabed and a vessel floating on the surface of the sea and taking, for example, petroleum. Since, in view of oil prices, it is currently becoming increasingly feasible to extract smaller fields, different wells are being served by one vessel. This means that, with the aid of the quick-acting coupling described above, a vessel handles several wells in succession. Such a coupling must be distinguished from much heavier couplings which are more complex in design, and which have to be uncoupled only in heavy weather, i.e. only a few times a year. In the case of couplings of the first-mentioned type, i.e. couplings for handling several wells, a high coupling and uncoupling speed and a short sailing time between the different pipelines is of primary importance, which contrasts with the devices which have to be uncoupled only a few times a year.

The object of the present invention is to provide a quick-acting coupling of the above-mentioned type which is simpler and thus cheaper to produce, without any risk to the guarantee of the seal. For, increasingly high standards are being set as regards possible pollution of the water.

This object is achieved in the case of a quick-acting coupling of the type described above in that the sealing element of one part has a bevelled end and the sealing element of the other part has a correspondingly bevelled socket. Through the use of a bevelled end falling into a corresponding socket, with at least one of the sealing faces being provided with flexible sealing means, a guaranteed seal can be obtained in a relatively simple manner between the parts to be connected.

According to an advantageous embodiment of the invention, at least one of the sealing elements is connected to the corresponding part in such a way that it can be moved. In this case the connection is first made between the two parts by the coupling means, and the seal is then achieved by moving the sealing element in question to the other element. An optimum seal can be provided by separating these two actions.

According to a further advantageous embodiment, the sealing element with the socket comprises a part made of rubber material. This makes it particularly simple to achieve a seal with the bevelled end. Reinforcements can be provided in this rubber material part in order to increase its strength properties.

In the case of the device according to the state of the art described above, the coupling means are fitted near a flange part. This means that the force exerted by the coupling means has to be absorbed by the flange parts, which can lead to undesirable deformation. The flange parts are therefore made very heavy, which involves corresponding efforts. According to a preferred embodiment of the invention, the coupling means are provided so that they engage at a distance from the sealing elements. This means that the coupling function between the two parts to be connected is shifted from the sealing elements and the sealing faces, so that a lighter construction will suffice.

According to a further advantageous embodiment of the invention, one of the parts is provided with centering pins, and the other part with corresponding holes, the coupling means being disposed on the part provided with holes and engaging on the centering pins.

The invention also relates to a quick-acting coupling assembly, comprising various quick-acting couplings of the type described above. These are preferably disposed concentrically relative to each other. If the sealing elements in this case are movable relative to the corresponding part, the sealing elements of the quick-acting couplings in question can be movable independently of each other. A multiple seal is built up step by step in this way.

The invention will be explained in greater detail below with reference to an embodiment according to the state of the art and a preferred embodiment of the invention. In the drawings:

FIG. 5 shows a quick-acting coupling assembly according to another embodiment of the invention.

Figure 1:
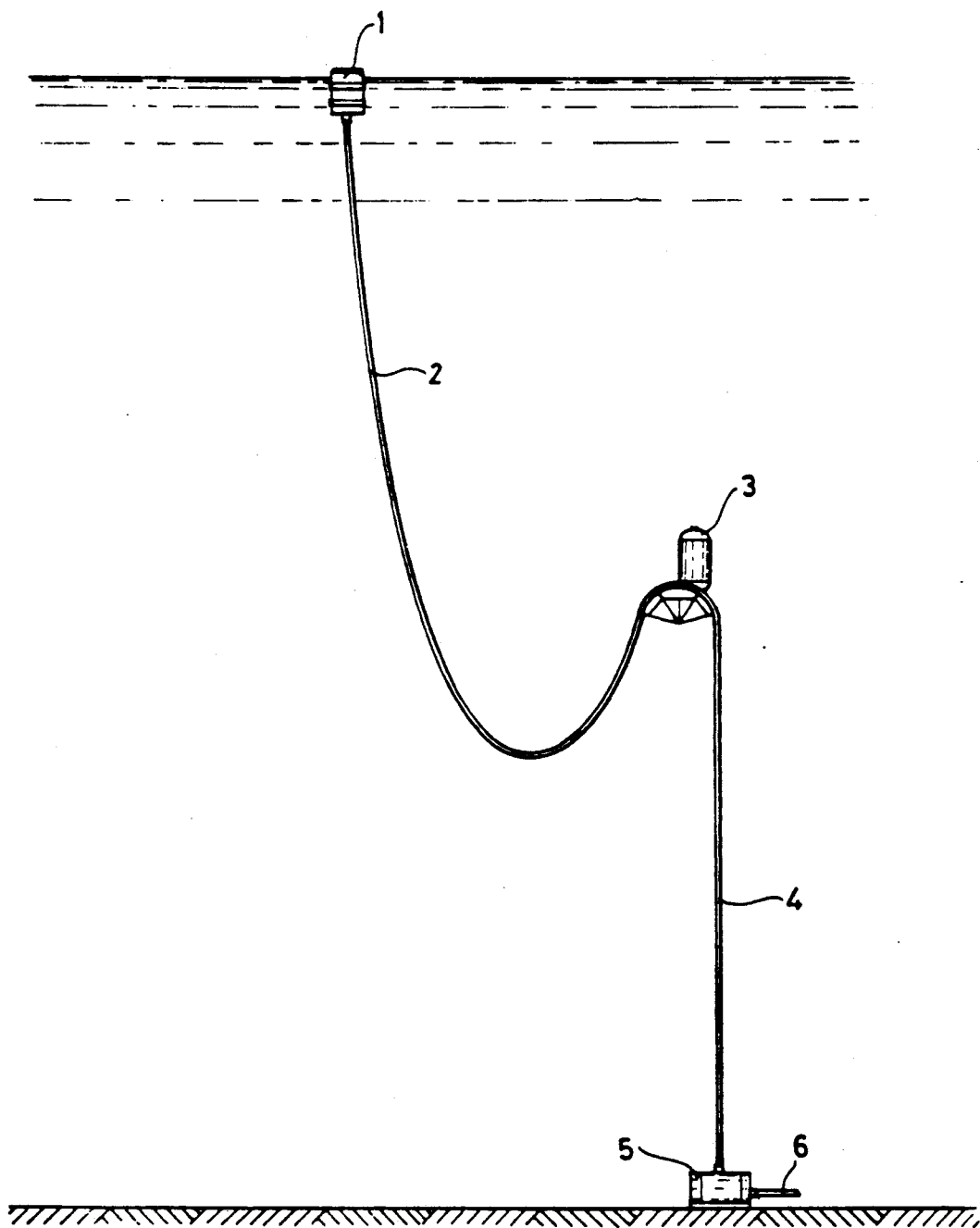
FIG. 1 shows schematically a quick-acting coupling both according to the invention and according to the state of the art connected to an oil well, uncoupled.

In FIG. 1 reference number 1 shows a floating buoy which is connected by means of a connecting hose 2 to a tank 3 situated below the surface of the sea. This tank 3 is connected by means of pipeline 4 to a base 5 which can be connected by pipeline 6 to an oil well, not shown. This well can be a well with a relatively low production, so that the constant presence of a storage vessel is not necessary, partly due to the presence of tank 3. In other words, one storage vessel can serve several of such devices.

Figure 2:
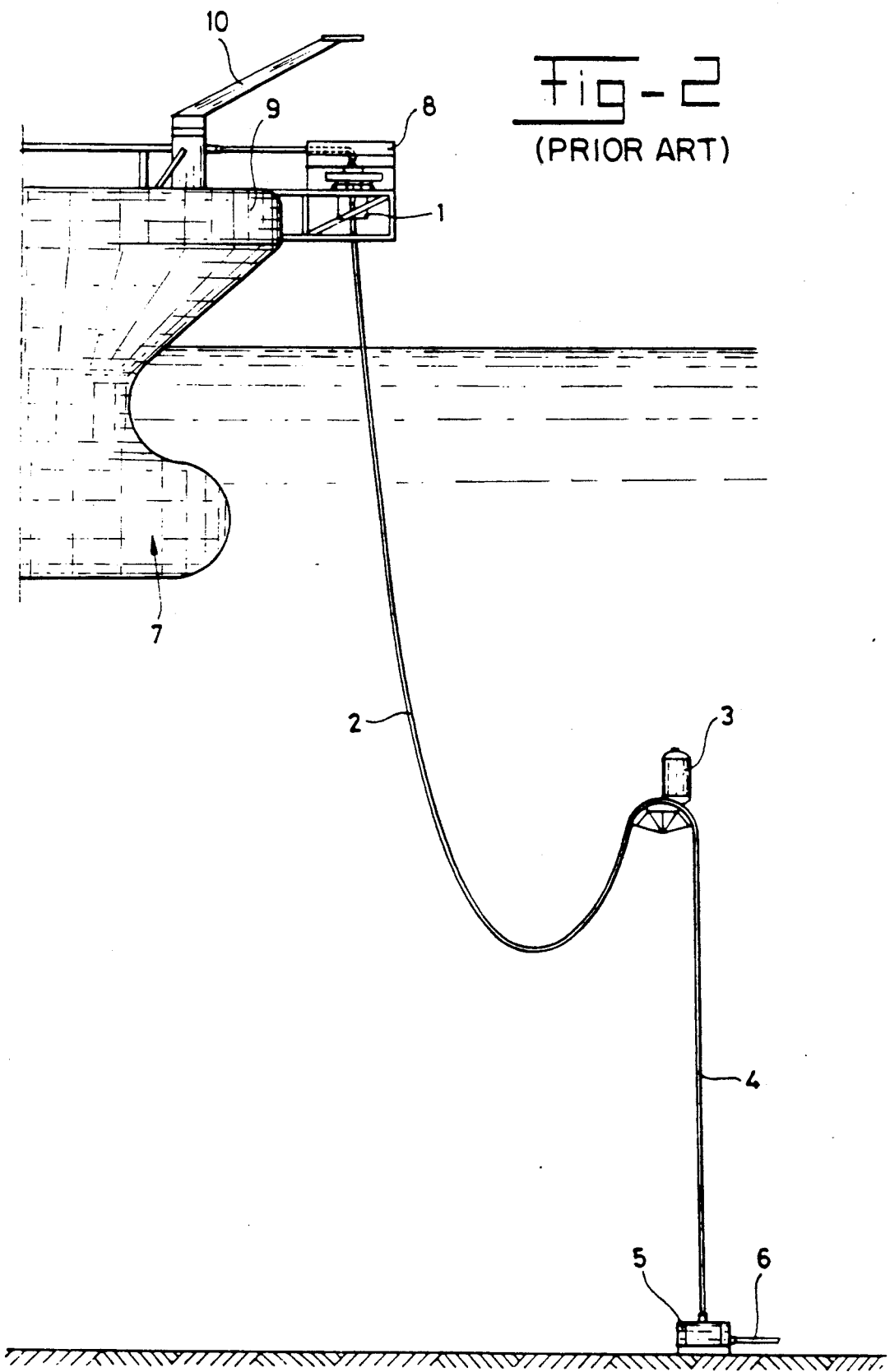
FIG. 2 shows the quick-acting coupling according to FIG. 1, coupled to a vessel.

FIG. 2 shows the situation after the arrival of the vessel. The latter is indicated in its entirety by 7.

With the aid of, for example, a chain (not shown) which can be connected to buoy 1, buoy 1, in which one part of the quick-acting coupling is located, is pulled to an extension 8 of the bow 9 of the ship by means of lifting device 10. After the coupling has been produced, the oil inside tank 3 is pumped over and when said tank is empty uncoupling takes place again, and buoy 1 is placed in the water again, so that the position shown in FIG. 1 is produced.

Figure 3:
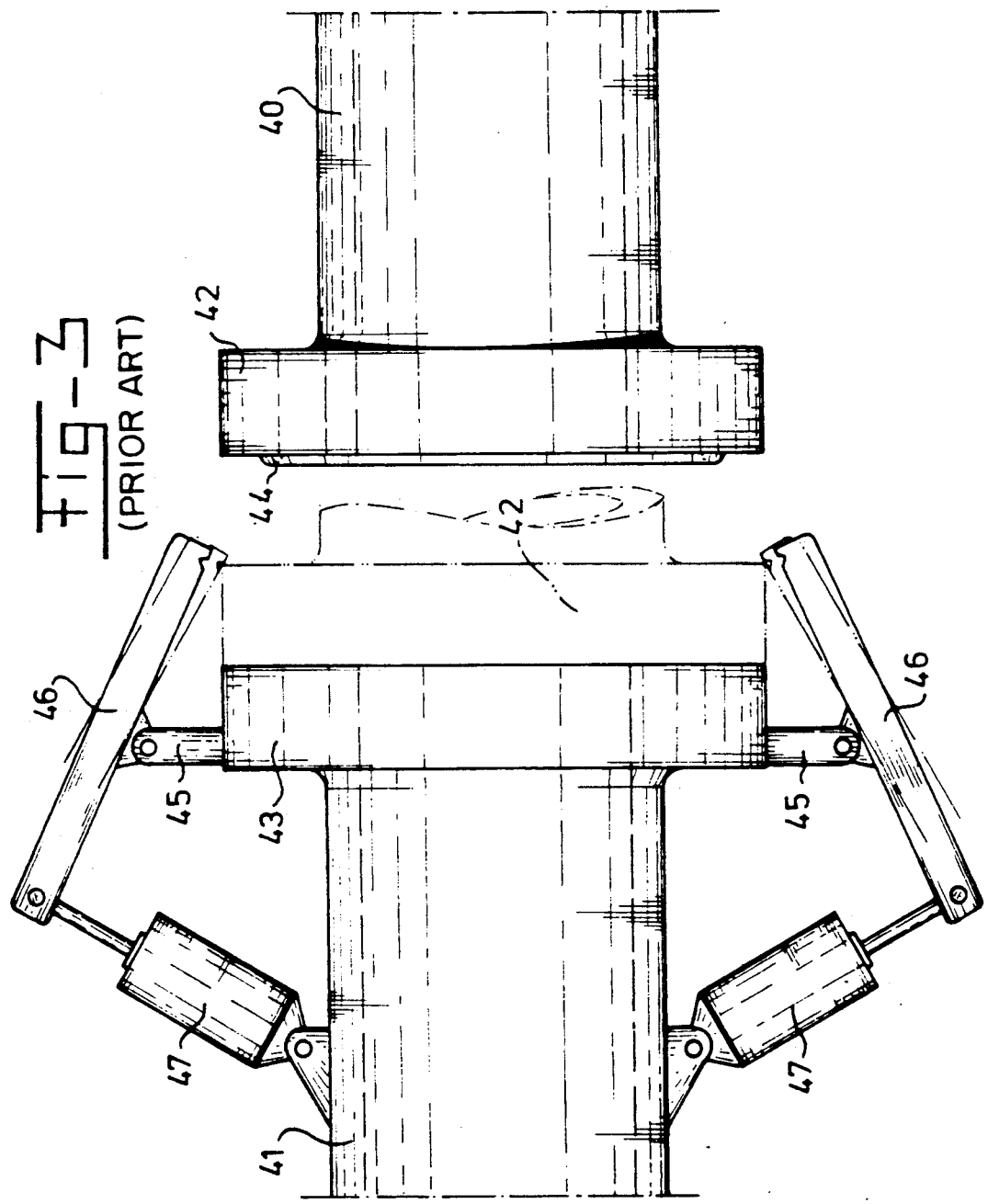
FIG. 3 shows in detail a quick-acting coupling according to the state of the art.

FIG. 3 shows a quick-acting coupling according to the state of the art. It comprises two interconnected parts, indicated by 40 and 41 respectively. They are both provided at the ends with flanges 42, 43 respectively. Flange 42 is provided with a groove (not shown), in which an O-ring indicated by 44 is accommodated. The facing faces of the flanges 42 and 43 are made truly flat by machining. Various arms 45 are connected to flange 43. Claws 46 are hingedly fixed to them, operated by hydraulic jacks 47.

This device works as follows: For coupling, the flanges 42 and 43 are moved towards each other, following which the operation of jacks 47 causes claws 46 engaging on the rear side of flange 42 to press the latter against flange 43. The disadvantage here is that both flange 43 and flange 42 will be deformed by the considerable local forces. Flanges 42 and 43 will consequently have to be made relatively heavy. High standards are also set for the finish of sealing faces going onto each other.

Figure 4:
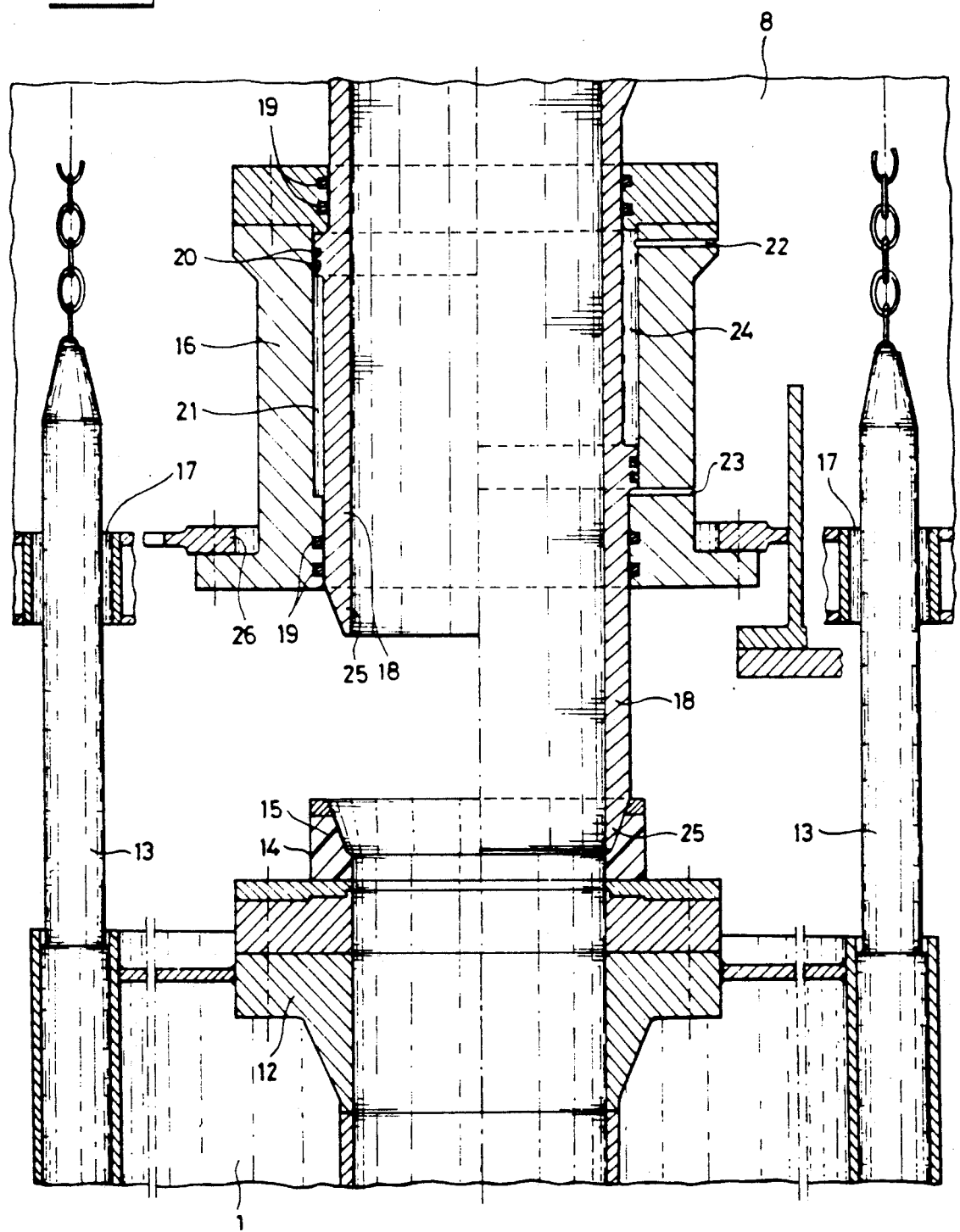
FIG. 4 shows in detail the quick-acting coupling according to the invention.

FIG. 4 shows in detail a first embodiment of the quick-acting coupling according to the invention in two different half cross-sections. It can be seen from this that one part (called "male part" below) is situated on the extension 8, and the other part ("female part") is in buoy 1. The female part comprises a housing 12 provided with pins 13 and a seat 14. Seat 14 is made of a rubber material reinforced with discs 15 or other reinforcement means. The male part, which is fitted on the extension 8, comprises housing 16 provided with holes 17 for the accommodation of centering pins 13. A sleeve 18 is also fitted in a sliding manner in housing 16. Seals 19 and 20 provide sealing between the sleeve 18 and the housing 16. In the position shown in FIG. 4 (on the left) a bottom chamber 21 is bounded between the sleeve 18 and the housing 16. It can be seen from FIG. 4 (on the right) that an oil channel 22 and an oil channel 23 are present. During the introduction of oil through channel 22 and the discharge of oil through channel 23 the sleeve 18 will move downwards out of the position shown in FIG. 4 (on the left) to the position shown in FIG. 4 (on the right) and bound a top chamber 24. The application of oil pressure in the opposite direction will cause the movement to take place in the opposite direction. On movement downwards the bevelled end 25 of the sleeve will go into engagement with seat 14 of elastomeric material on the female part. Clamping means 26, which can clamp centering pins 13 relative to the housing 17 by means of jack devices (not shown), are present. As can be seen from FIG. 4, seat 14 is free-standing and radially unconfined over the entire height of its contact with bevelled end 25.

The quick-acting coupling shown in FIG. 4 works as follows: The male and female parts are moved towards each other by means of the schematically shown chain described earlier, and their relative positions are determined by the centering pins 13 and the holes 17. When they are moved towards each other to a sufficient degree, the position between the housing 12 and housing 16 is fixed by the clamping means 26. However, various circumstances can mean that this relative position is not always exactly in line. In particular, the rough operation at sea will produce such a position of not being accurately in line. Sleeve 18 is then moved downwards from the position shown in FIG. 4 (on the left) to the position in FIG. 4 (on the right). The yielding nature of seat 14 means that any variation in the relative positions between housing 12 and housing 16 can be accommodated, while a guaranteed seal is still achieved. During uncoupling the steps described above take place in the reverse order. Of course, a valve (not shown) is present in the female part in buoy 1.

FIG. 5 shows a second embodiment of a quick-acting coupling assembly according to the invention, comprising different quick-acting couplings of the type described above which are disposed concentrically relative to each other. Corresponding parts are provided with the same reference numbers here. A second bevelled end 25' is present inside bevelled end 25, and a seat 14' inside seat 14. Bevelled end 25' is movable, in a manner not shown, independently relative to part 25. In other words, after the connection is made between the two parts, part 25' can be moved downwards first, followed by part 25, or vice versa. In this way it is possible in a particularly simple manner to provide a coupling with concentric channels.

Although the invention is described above with reference to preferred embodiments, it must be understood that it is not limited thereto. For example, it is possible in particular to use the quick-acting coupling for totally different applications.

We claim:

1. Quick-acting coupling for the fluid-tight connection of two parts, each provided with sealing elements with sealing faces, at least one sealing face comprising flexible sealing means, and coupling means being present for connecting said parts in such a way that they do not move relative to each other, wherein the sealing element of one part has a bevelled end and the sealing element of the other part has a correspondingly bevelled socket which receives said bevelled end and which have a substantial height of sealing contact with each other axially of the coupling, and wherein said flexible sealing means is free-standing and radially unconfined over the entire height of its sealing contact with the other said sealing face.

2. Quick-acting coupling according to claim 1, in which the sealing element with the socket comprises a rubber material part.

3. Quick-acting coupling according to claim 2, in which reinforcements are provided in the rubber material.

4. Quick-acting coupling according to claim 1, in which the coupling means are provided engaging at a distance from the sealing elements.

5. Quick-acting coupling according to claim 1, in which one of the parts is provided with centering pins, and the other part is provided with corresponding holes, and in which the coupling means are fitted on the part provided with holes and engage on the centering pins.

6. Quick-acting coupling assembly according to claim 1, characterised in that the quick-acting coupling includes at least two members in each said part with each member provided with said sealing elements.

7. Quick-acting coupling assembly according to claim 6, in which the said two members of said quick-acting couplings are disposed concentrically relative to each other.

8. Quick-acting coupling assembly according to claim 6, in which the sealing elements of the quick-acting couplings are movable independently of each other.

* * * * *